United States Patent
Gebbie et al.

(10) Patent No.: US 10,457,111 B2
(45) Date of Patent: Oct. 29, 2019

(54) CLIMATE CONTROL SYSTEM FOR A VEHICLE

(71) Applicant: FORD GLOBAL TECHNOLOGIES, LLC, Dearborn, MI (US)

(72) Inventors: James George Gebbie, Rochester, MI (US); Clay Wesley Maranville, Ypsilanti, MI (US); Timothy Blatchley, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 891 days.

(21) Appl. No.: 14/613,449

(22) Filed: Feb. 4, 2015

(65) Prior Publication Data

US 2016/0221413 A1 Aug. 4, 2016

(51) Int. Cl.
*B60H 1/00* (2006.01)

(52) U.S. Cl.
CPC ..... *B60H 1/00278* (2013.01); *B60H 1/00921* (2013.01); *B60H 2001/00307* (2013.01); *B60H 2001/00928* (2013.01); *B60H 2001/00949* (2013.01)

(58) Field of Classification Search
CPC .. B60H 1/00; B60H 1/00278; B60H 1/00785; B60H 1/00899; B60H 1/32; B60H 1/323; B60H 1/00291; B60H 2001/00307; B60H 2001/00928; B60H 2001/00949; F25B 30/00; F25B 30/02; F24F 5/00; F24F 5/001; B60L 58/24
USPC .......... 165/201, 202, 104.33, 41, 42, 104.11, 165/200; 62/239, 243, 244, 79, 90, 178; 454/69, 75
See application file for complete search history.

(56) References Cited

U.S. PATENT DOCUMENTS

| 4,616,484 | A | 10/1986 | Mehdi et al. |
| 5,678,761 | A * | 10/1997 | Ikeda ................. B60H 1/00007 237/12.3 A |
| 6,212,900 | B1 | 4/2001 | Iritani et al. |
| 7,971,447 | B2 | 7/2011 | Maitre |
| 8,402,776 | B2 * | 3/2013 | Johnston ............... B60L 3/0046 62/79 |
| 8,620,502 | B2 | 12/2013 | Allen |

(Continued)

FOREIGN PATENT DOCUMENTS

| CN | 102679477 A | 9/2012 |
| CN | 102692095 A | 9/2012 |

(Continued)

OTHER PUBLICATIONS

Office Action for Chinese Application No. 201610079511.6, dated Jul. 30, 2019, 7 pages.

*Primary Examiner* — Keith M Raymond
*Assistant Examiner* — Gustavo A Hincapie
(74) *Attorney, Agent, or Firm* — David Kelley; Brooks Kushman P.C.

(57) ABSTRACT

A vehicle includes a climate control system having a heat pump subsystem. The heat pump subsystem has a cabin loop with interior and exterior heat exchangers, and a battery loop with a battery chiller. A valve selectively connects the cabin loop and battery chiller in fluid communication. The vehicle also includes a controller programed to, in response to the heat pump subsystem being in dehumidification mode, command the valve to close to inhibit refrigerant flow to the battery chiller.

17 Claims, 5 Drawing Sheets

(56) References Cited

U.S. PATENT DOCUMENTS

| | | | |
|---|---|---|---|
| 9,533,545 B2* | 1/2017 | Chang | B60H 1/00392 |
| 10,190,812 B2* | 1/2019 | Ragazzi | B60H 1/00457 |
| 2005/0204768 A1* | 9/2005 | Di Vito | B60H 1/00899 |
| | | | 62/324.1 |
| 2007/0193290 A1* | 8/2007 | Ebara | B60H 1/00885 |
| | | | 62/238.6 |
| 2009/0193830 A1* | 8/2009 | Yoshioka | B60H 1/0005 |
| | | | 62/239 |
| 2009/0205353 A1* | 8/2009 | Takahashi | B60H 1/00899 |
| | | | 62/324.1 |
| 2009/0241573 A1* | 10/2009 | Ikegami | B60H 1/00335 |
| | | | 62/238.7 |
| 2010/0000713 A1* | 1/2010 | Takahashi | B60H 1/00899 |
| | | | 165/61 |
| 2012/0247716 A1* | 10/2012 | Galtz | B60H 1/00278 |
| | | | 165/42 |
| 2013/0019615 A1* | 1/2013 | Choi | B60H 1/00 |
| | | | 62/79 |
| 2013/0152611 A1 | 6/2013 | Furll et al. | |
| 2013/0298583 A1* | 11/2013 | O'Donnell | H01M 6/5038 |
| | | | 62/115 |
| 2014/0096550 A1* | 4/2014 | Gao | B60L 11/1874 |
| | | | 62/115 |
| 2014/0202178 A1* | 7/2014 | Trumbower | B60H 1/00278 |
| | | | 62/62 |
| 2015/0034272 A1* | 2/2015 | Saab | B60H 1/00278 |
| | | | 165/43 |
| 2015/0128632 A1* | 5/2015 | Kishita | B60L 11/1875 |
| | | | 62/324.6 |
| 2015/0273981 A1* | 10/2015 | Kang | B60H 1/3207 |
| | | | 62/324.6 |
| 2015/0291002 A1* | 10/2015 | Smith | B60H 1/00278 |
| | | | 165/203 |
| 2015/0362268 A1* | 12/2015 | Maeda | G05D 23/1917 |
| | | | 165/294 |
| 2016/0018153 A1* | 1/2016 | Ragazzi | F25B 30/02 |
| | | | 62/324.1 |
| 2016/0068041 A1* | 3/2016 | Kim | B60H 1/00735 |
| | | | 62/115 |
| 2016/0107508 A1* | 4/2016 | Johnston | B60H 1/00278 |
| | | | 165/202 |
| 2016/0193896 A1* | 7/2016 | Miyakoshi | B60H 1/00385 |
| | | | 62/155 |
| 2017/0021698 A1* | 1/2017 | Hatakeyama | F25B 7/00 |
| 2017/0214008 A9* | 7/2017 | Mardall | H01M 2/1077 |

FOREIGN PATENT DOCUMENTS

| | | |
|---|---|---|
| CN | 102840710 A | 12/2012 |
| CN | 103587373 A | 2/2014 |
| CN | 103648824 A | 3/2014 |

* cited by examiner

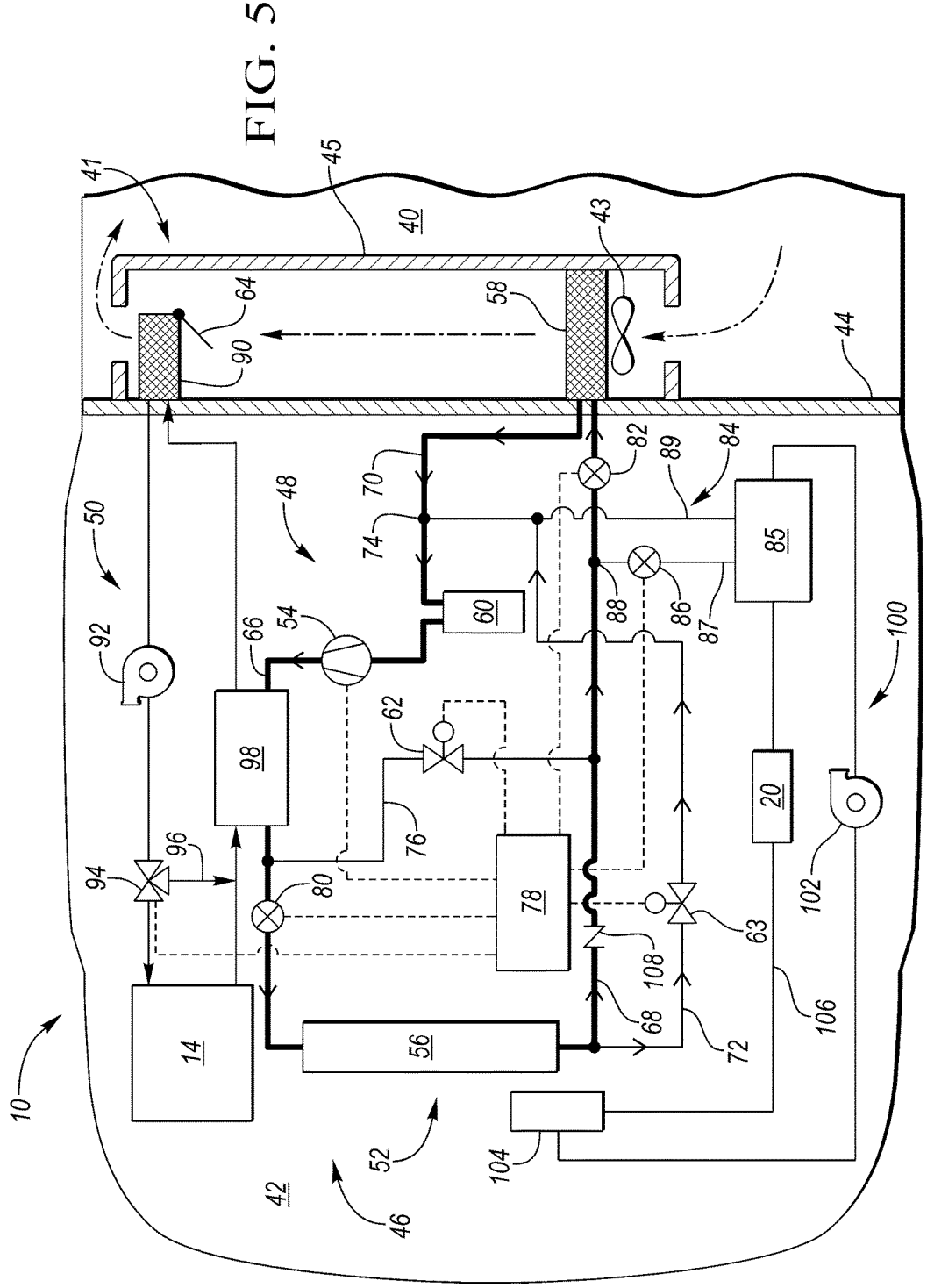

CLIMATE CONTROL SYSTEM FOR A VEHICLE

TECHNICAL FIELD

The present disclosure relates to climate control systems for motor vehicles and specifically to climate control systems that include a heat pump subsystem and a battery charger.

BACKGROUND

Vehicles such as battery-electric vehicles (BEVs), plug-in hybrid electric vehicles (PHEVs) and full hybrid-electric vehicles (FHEVs) contain a traction battery assembly to act as an energy source for the vehicle. The traction battery assembly includes components and systems to assist in managing vehicle performance and operations. The traction battery assembly also includes high voltage components. Some hybrid and electric vehicles are equipped with a climate control system that includes a heat pump subsystem for warming, cooling and/or dehumidifying a passenger cabin.

SUMMARY

According to an embodiment of the present disclosure, a vehicle includes a climate control system having a heat pump subsystem. The heat pump subsystem has a cabin loop with interior and exterior heat exchangers, and a battery loop with a battery chiller. A valve selectively connects the cabin loop and battery chiller in fluid communication. The vehicle also includes a controller programed to, in response to the heat pump subsystem being in dehumidification mode, command the valve to close to inhibit refrigerant flow to the battery chiller.

According to another embodiment of the present disclosure, a vehicle with a climate control system includes a heat pump subsystem and a battery loop. The heat pump subsystem has a cabin loop with an interior heat exchanger, an exterior heat exchanger, and a compressor. The battery loop has a battery chiller and a first actuatable expansion device selectively connecting the cabin loop and battery chiller in fluid communication. The cabin loop further includes a second actuatable expansion device between the compressor and the exterior heat exchanger, and a third actuatable expansion device between the exterior and interior heat exchangers. The vehicle further includes at least one controller programed to, in response to the heat pump subsystem being in dehumidification mode, command the first expansion device to a closed position to inhibit refrigerant flow to the battery chiller.

According to yet another embodiment of the present disclosure, a climate control system includes a heat pump subsystem having a cabin loop with interior and exterior heat exchangers, and a battery loop with a battery chiller. A valve is selectively connects the cabin loop and battery chiller in fluid communication. A controller is programed to, in response to the heat pump subsystem being in dehumidification mode, command the valve to close to inhibit refrigerant flow to the battery chiller.

BRIEF DESCRIPTION OF THE DRAWINGS

FIG. 5 illustrates a schematic of the climate control system of the vehicle with the heat pump subsystem in series dehumidification mode.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
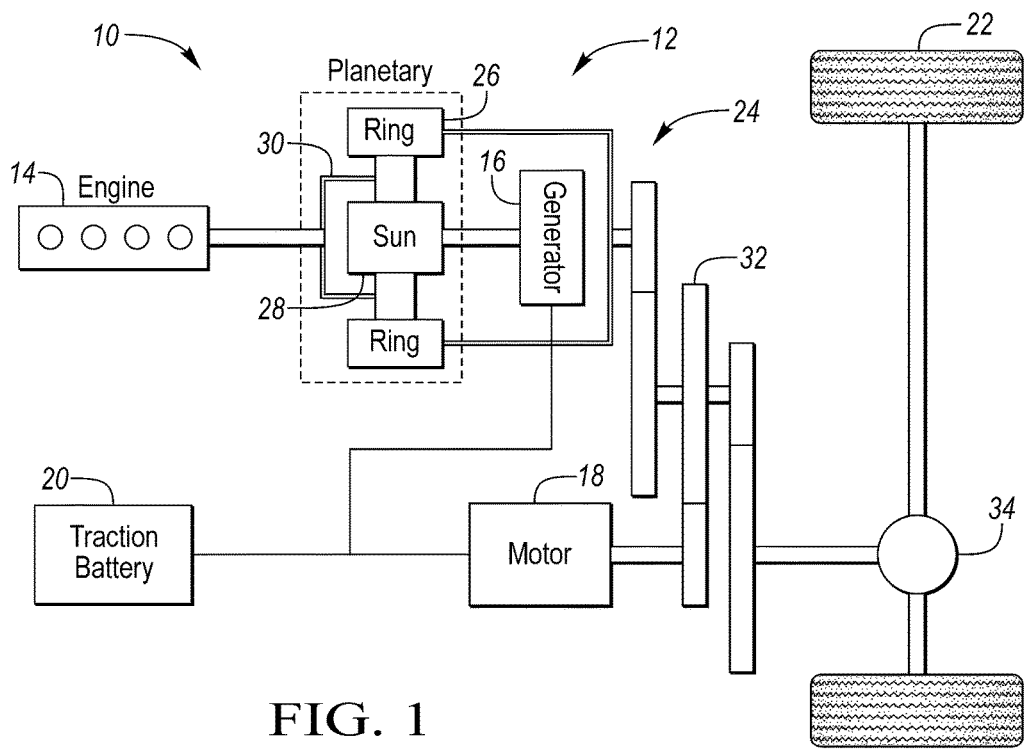
FIG. 1 illustrates a schematic of a hybrid electric vehicle.

Referring to FIG. 1, a vehicle 10 may include a powertrain 12, such as a power-split powertrain system including a first drive system and a second drive system. The first drive system includes an engine 14 and a first electric machine or generator 16. The second drive system includes a second electric machine or motor 18, the generator 16, and a traction battery assembly 20. The first and second drive systems generate torque to drive one or more of the vehicle driven wheels 22.

The engine 14, such as an internal combustion engine, and the generator 16 may be connected through a power transfer unit 24. The power transfer unit 24 may be a planetary gear set that includes a ring gear 26, a sun gear 28 and a carrier assembly 30. Other types of power transfer units are contemplated by the present disclosure. The powertrain 12 may include additional gearing 32 for coupling the generator 16 to the motor 18 and for coupling the generator and/or the motor to the differential 34 to distribute torque to the wheels 22. While FIG. 1 illustrates a hybrid vehicle, the vehicle 10 may also be a fully electric vehicle, in which case the engine 14 is omitted Referring to FIG. 2, the vehicle 10 includes a cabin 40 and an engine compartment 42 that are separated by a bulkhead 44. The engine compartment 42 houses at least a portion of the climate control system 46. The climate control system may include a heat pump subsystem 48, a coolant subsystem 50, and a ventilation system 41 disposed within the dash of the cabin 40. The climate control system 46, in coordination with the ventilation system 41, provides hot and/or cold air into the passenger cabin 40. The ventilation system 41 includes a housing 45 having an air intake side and air outlet side. The outlet side is connecting to ducts that distribute exiting air into the cabin 40. A blower motor drives a fan 43 for circulating air in the ventilation system 41.

The vehicle 10 also includes one or more controllers 78 in electrical communication with one or more components of the climate control system 46 to control operation of the system. The controller 78 generally includes any number of microprocessors, ASICs, ICs, memory (e.g., FLASH, ROM, RAM, EPROM and/or EEPROM) and software code to co-act with one another to perform a series of operations. The controller also includes predetermined data, or "look up tables" that are based on calculations and test data, and are stored within the memory. The controller 78 may communicate with other vehicle systems and controllers over one or more wired or wireless vehicle connections using common bus protocols (e.g., CAN and LIN).

The heat pump subsystem 48 may be a vapor compression heat pump subsystem that circulates a refrigerant transferring thermal energy to various components of the climate control system 46. The heat pump subsystem 48 may include a cabin loop 52 having a compressor 54, an exterior heat exchanger 56, an interior heat exchanger 58, an accumulator 60, fittings, valves and expansion devices. The exterior heat exchanger 56 may be located behind the grill near the front of the vehicle, and the interior heat exchanger 58 may be disposed within the housing 45 of the ventilation system 41. The cabin loop components are connected in a closed loop by a plurality of conduits, tubes, hoses or lines. For Example, a first conduit 66 connects the compressor 54 and the exterior heat exchanger 56 in fluid communication, a second conduit 68 connects the interior and exterior heat exchangers 56, 58 in fluid communication, and a third conduit 70 connects the interior heat exchanger 56 and the compressor 54 in fluid communication. A first bypass conduit 72 connects the exterior heat exchanger 56 to conduit 70, and a second bypass conduit 76 connects conduit 66 to conduit 68. Each of the bypass conduits may include a valve 62, 63 such as a solenoid valve, for opening and closing the bypass. A first expansion device 80 may be disposed on conduit 66 and a second expansion device 82 may be disposed on conduit 68. The expansion devices are configured to change the pressure and temperature of the refrigerant of the heat pump subsystem 48. The expansion devices may include an electronic actuator that is controlled with the controller 78. The controller 78 may instruct the actuator to position the expansion device in a wide-open position, a fully closed position, or a throttled position. The throttled position is a partially open position where the controller modulates the size of the valve opening to regulate flow through the expansion device. The controller 78 and expansion devices are configured to continuously or periodically modulate the throttled position in response to system operating conditions. By throttling the position of the expansion device the controller can regulate flow, pressure, temperature, and state of the refrigerant as is needed.

The heat pump subsystem 48 also includes a battery loop 84 having a chiller 85 and a third expansion device 86. The battery loop 84 may include a supply conduit 87 that is connected to conduit 68 at fitting 88 and is connected to the chiller 85. The expansion device 86 is on the supply conduit 87. Expansion device 86 may be similar to expansion devices 80 and 82. A return conduit 89 connects the battery chiller 85 and conduit 70 in fluid communication. The return conduit 89 may connect with conduit 70 via fitting 74.

A battery cooling loop 100 regulates the temperature of the traction battery 20 and is in fluid communication with the chiller 85. The battery cooling loop 100 may include a radiator 104, a pump 102 and a plurality of conduits 106 that form a closed cooling loop for the traction battery 20. The battery chiller 85 facilitates the transfer of thermal energy between the heat pump subsystem 48 and the battery cooling loop 100. The battery chiller 85 may have any suitable configuration. For example, the chiller 85 may have a plate-fin, tube-fin, or tube-and-shell configuration that facilitates the transfer of thermal energy without mixing the heat transfer fluids in the battery coolant loop 100 and the heat pump subsystem 48. The battery coolant loop 100 may operate independently of the climate control system 46 and is capable of dissipating heat from the traction battery 20 via the radiator 104. The battery coolant loop 100 may include a bypass line (not shown) for bypassing the radiator when the chiller is being used. The battery coolant loop 100 may also operate in cooperation with the climate control system 46 in order to dissipate heat utilizing the battery chiller 85. For example, if the traction battery is particularly hot, the battery chiller 85 and the radiator 104 may both be used in order to dissipate heat within the traction battery 20.

The coolant subsystem 50 may include a heater core 90, a pump 92, a valve 94, and a plurality of conduits forming a closed loop for circulating coolant. In the case of a hybrid vehicle, the cooling subsystem 50 is in fluid communication with an internal combustion engine 14. Waste heat produced by the engine 14 is captured by the coolant and is circulated to the heater core 90 disposed within the ventilation system 41. One or more fans 43 of the ventilation system 41 circulate air over and through the heater core 90 providing warm air into the cabin 40. A blend door 64 is actuatable to adjust the temperature of the air exiting the housing. The coolant subsystem 50 may include a bypass conduit 96 for bypassing the engine 14 when insufficient waste heat is available. The opening and closing of the bypass conduit 96 is controlled by the valve 94 that may be electrically controlled by the controller 78. If the vehicle 10 is a fully electric vehicle, the engine 14 is omitted and may be replaced with an electric heating element for providing thermal energy to the coolant subsystem 50, or the coolant subsystem 50 may not include a heater. In some embodiments, a hybrid electric vehicle may include an electric heater to supply heat to the coolant subsystem 50 when the engine 14 is off or cold. The coolant subsystem 50 may extract heat from the heat pump subsystem 48 via an intermediary heat exchanger 98 in order to provide heating to the cabin 40.

The intermediary heat exchanger 98 facilitates the transfer of thermal energy between the coolant subsystem 50 and the heat pump subsystem 48. The intermediary heat exchanger 98 may be part of the coolant subsystem 50, the heat pump subsystem 48, or both. The intermediary heat exchanger 98 may have any suitable configuration. For example, the intermediary heat exchanger 98 may have a plate-fin, tube-fin, or tube-and-shell configuration that facilitates the transfer of thermal energy without mixing the heat transfer fluids in the coolant subsystem 50 and the heat pump subsystem 48. The intermediary heat exchanger 98 may be connected to the first conduit 66 of the heat pump 48 and connected to one of the conduits of the coolant subsystem 50.

Figure 2:
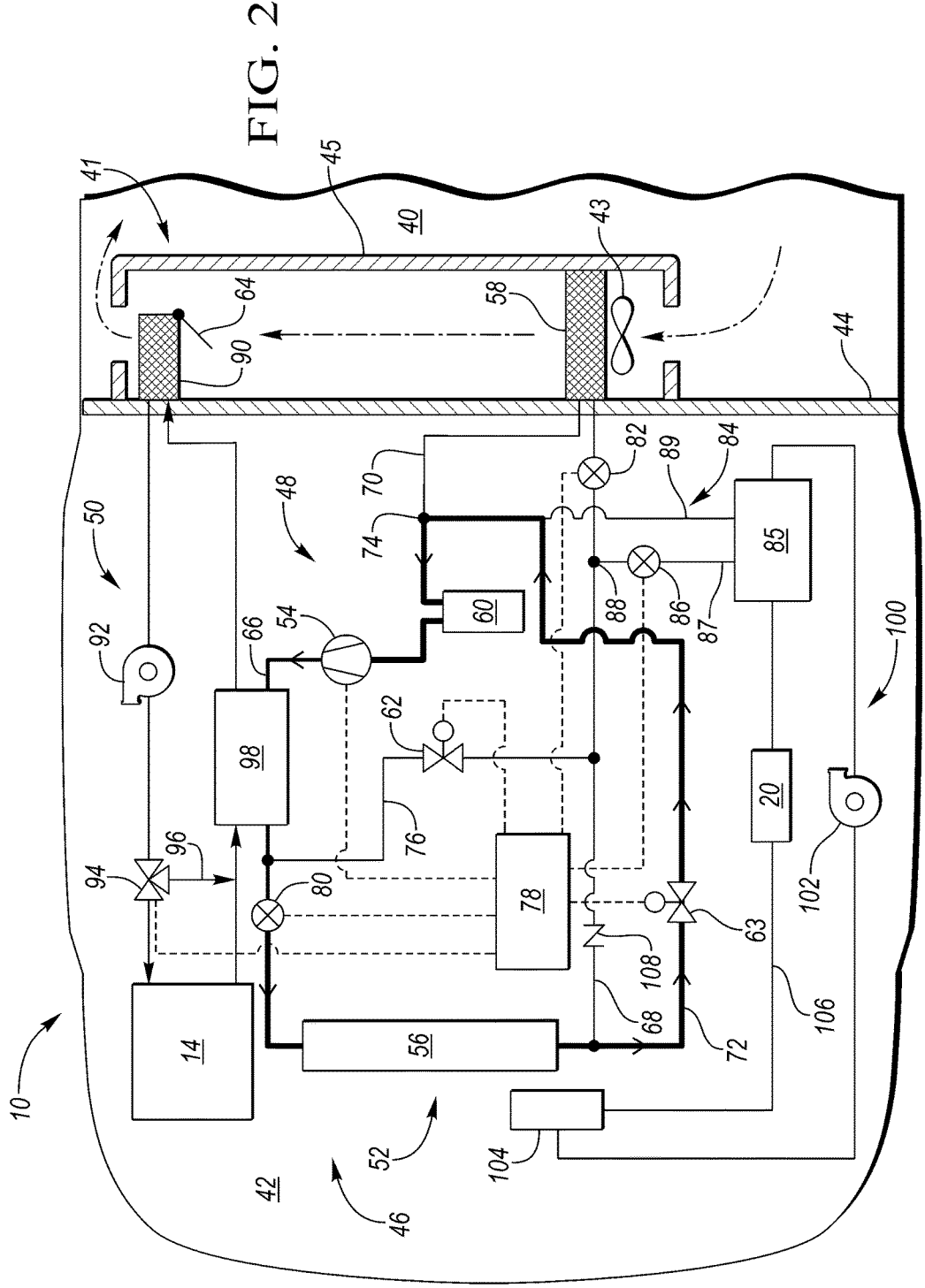
FIG. 2 illustrates a schematic of a climate control system of the vehicle with the heat pump subsystem in heating mode.

The heat pump subsystem 48 may be operated in a plurality of different modes, such as heating mode, cooling mode, parallel dehumidification mode, and series dehumidification mode. FIG. 2 illustrates the heat pump subsystem 48 operating in heating mode. In heating mode, the compressor 54 pressurizes the refrigerant into a hot vapor that is circulated to the intermediary heat exchanger 98. The thermal energy from the refrigerant is transferred into the coolant circulating through the coolant side of the heat exchanger 98 to heat the coolant in the coolant subsystem 50. The pump 92 circulates the heated coolant to the heater core 90 to warm the cabin 40. The intermediary heat exchanger 98 acts as a condenser causing the refrigerant to condense into a liquid. Next, the refrigerant passes through the first expansion device 80, which is in a throttled position. The expansion device 80 reduces the pressure of the refrigerant and lowers the temperature of the refrigerant prior to entering the exterior heat exchanger 56. The controller 78 may throttle the expansion device 80 to ensure that the temperature of the refrigerant is below the outside air temperature to facilitate evaporation of the refrigerant within the exterior heat exchanger 56. Expansion device 82 is closed and valve 63 is open causing refrigerant exiting the exterior heat exchanger 56 to flow through conduit 72 bypassing the interior heat exchanger 58. The refrigerant is then circulated through conduit 70 and back to the compressor 54 for recirculation. In heating mode, the expansion device 86 may be closed to deactivate the chiller 85, or may be open to activate the chiller 85.

Figure 3:
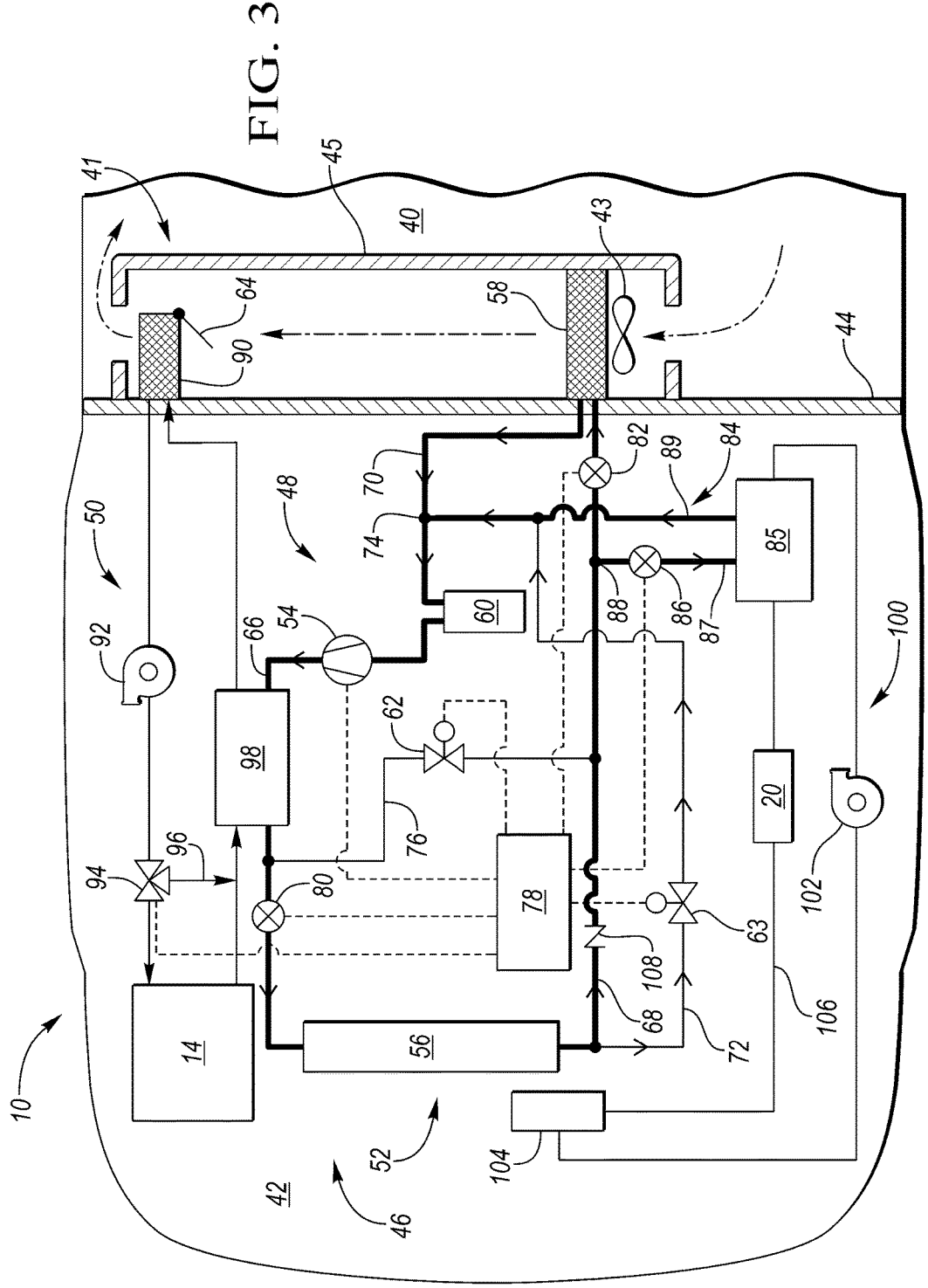
FIG. 3 illustrates a schematic of the climate control system of the vehicle with the heat pump subsystem in cooling mode.

FIG. 3 illustrates the heat pump subsystem 48 in cooling mode. In cooling mode, the coolant subsystem 50 may be ON or OFF, and the battery cooling loop 100 may be ON or OFF depending upon operating conditions of the traction battery 20. The compressor 54 pressurizes the refrigerant into a hot vapor that is circulated through the inactive intermediary heat exchanger 98 to the expansion device 80, which is in the fully open position. The exterior heat exchanger 56 acts as a condenser and heat is transferred from the refrigerant to the outside air causing the refrigerant to condense into a substantially liquid state. Valve 63 is closed and the refrigerant exiting the exterior heat exchanger 56 travels along conduit 68 to the second expansion device 82, which is in the throttled position. The expansion device 82 lowers the pressure and temperature of the refrigerant prior to entering the interior heat exchanger 58. The interior heat exchanger 58 acts as an evaporator and extracts heat from air being circulated within the housing in order to cool the cabin 40. The refrigerant exits the interior heat exchanger 58 as a vapor and is circulated through the accumulator 60 and back to the compressor 58. Expansion device 86 may be in a closed or throttled position depending upon the operating state of the traction battery 20. If the expansion device 86 is in the throttled position, then the battery chiller 85 acts as an evaporator and transfers heat from the battery cooling loop 100 to the heat pump subsystem 48.

The heat pump subsystem 48 may also include at least one dehumidification mode where the heater core 90 and interior heat exchanger 58 are operated simultaneously. The coolant subsystem 50 is activated during dehumidification mode in order to provide heated coolant to the heater core 90. In dehumidification mode, air within the ventilation system 41 is first blown across the evaporator 58 causing the air to cool and dehumidify, and is then blown across the heater core 90 to re-heat the air prior to being circulated into the passenger seating area. The heat pump subsystem 48 may have multiple dehumidification modes such as parallel dehumidification mode and series dehumidification mode.

Figure 4:
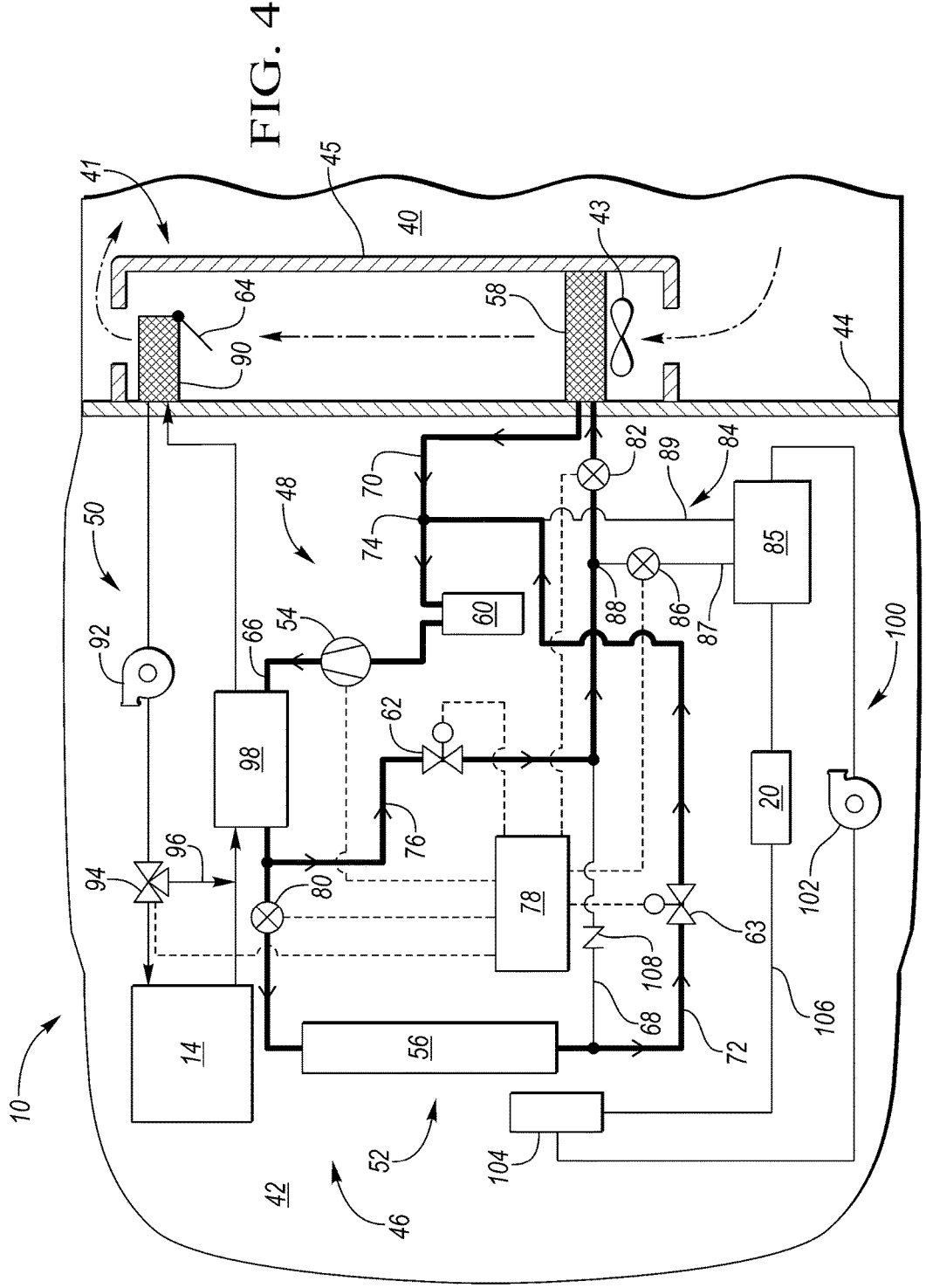
FIG. 4 illustrates a schematic of the climate control system of the vehicle with the heat pump subsystem in parallel dehumidification mode.

FIG. 4 illustrates the heat pump subsystem 48 in parallel dehumidification mode. In parallel dehumidification mode, the compressor 54 pressurizes the refrigerant into a hot vapor that is circulated to the intermediary heat exchanger 98. The thermal energy from the refrigerant is transferred into the coolant circulating through the coolant side of the heat exchanger 98 to heat the coolant. The pump 92 circulates the heated coolant to the heater core 90 to warm the cabin 40. The intermediary heat exchanger 98 acts as a condenser and causes refrigerant passing through to condense into a liquid. Next, a portion of the refrigerant passes through the first expansion device 80, which is in the throttled position, to the exterior heat exchanger 56, which is acting as an evaporator. Solenoid valve 62 is open causing a portion of the refrigerant to bypass the exterior heat exchanger 56 and go directly to the expansion device 82. A check valve 108 prevents refrigerant from flowing upstream in conduit 68. Expansion device 82 is in a throttled position causing the refrigerant to reduce in temperature and pressure prior to entering the evaporator 58. The refrigerant exits the evaporator as a vapor and is returned to the compressor 54 via conduit 70. The valve 63 of the bypass conduit 72 is open allowing refrigerant exiting the exterior heat exchanger to be routed to conduit 70 and bypass the interior heat exchanger 58.

FIG. 5 illustrates the heat pump subsystem 48 in series dehumidification mode. In series dehumidification mode, the compressor 54 pressurizes the refrigerant into a hot vapor that is circulated to the intermediary heat exchanger 98. The thermal energy from the refrigerant is transferred into the coolant circulating through the coolant side of the heat exchanger 98 to heat the coolant. The pump 92 circulates the heated coolant to the heater core 90 to warm the cabin 40. The intermediary heat exchanger acts as a condenser and causes the refrigerant to condense into a liquid. Next, the refrigerant passes through the first expansion device, which is in the throttled position, and to the exterior heat exchanger 56, which is acting as an evaporator. In series dehumidification mode, the valve 62 is closed routing all of the refrigerant through the exterior heat exchanger 56. The refrigerant exits the exterior heat exchanger 56 in a mixed liquid/vapor phase. Valve 63 is also closed and all of the refrigerant is routed to the second expansion valve 82, which is in a throttled position. Next, the refrigerant circulates through interior evaporator 58 dehumidifying air passing over the interior heat exchanger 58. Refrigerant exiting the evaporator 58 is routed back to the compressor 54 via conduit 70.

In both dehumidification modes expansion device 86 is closed and the battery chiller 85 is inactive. In order to run the battery chiller 85 during dehumidification mode, all three expansion devices would have to be in the throttled position and electronically controlled simultaneously. This requires complex control logic that may not be robust and reliable enough for mass production. Operating two of the three expansion devices simultaneously in a throttled position is less complex and is a more reliable solution. Battery cooling loop 100 includes a radiator 104 that can sufficiently cool the battery 20 during dehumidification mode.

Figure 6:
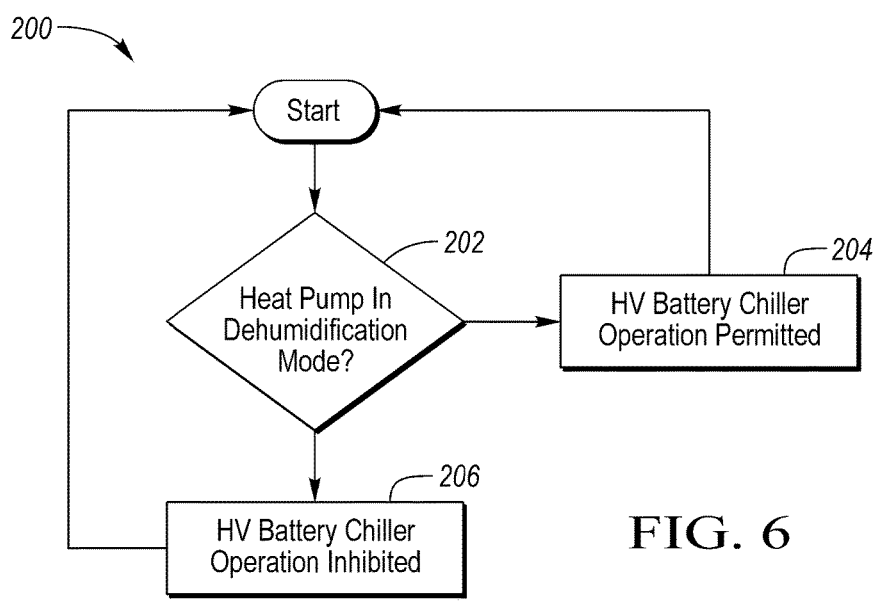
FIG. 6 is a flowchart for controlling a climate control system of the vehicle.

Referring to FIG. 6 a flow chart 200 is illustrated for operating the heat pump subsystem 48. The controller 78 may send and receive instructions to and from various components of the heat pump subsystem 48 in order to implement the steps of the flowchart. At step 202 the controller determines if the heat pump subsystem 48 is operating in dehumidification mode. If the system is not in dehumidification mode then operation of the chiller 85 is permitted at step 204 and the expansion device 86 is opened and closed according to the thermal management protocols of the traction battery 20. If the system is in dehumidification mode than control passes to block 206. At block 206 the expansion device 86 is closed to inhibit operation of the battery chiller 85.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a heat pump including a cabin loop having a compressor, an exterior heat exchanger, a first expansion device therebetween, an interior heat exchanger, and a second expansion device between the interior and exterior heat exchangers, and including a battery loop having a battery chiller and a third expansion device selectively connecting the cabin loop and the battery chiller in fluid communication;
a traction battery;
a battery coolant loop including a radiator and a conduit, configured to circulate coolant through the radiator, the battery chiller, and the traction battery, wherein the battery coolant loop is connected to the heat pump only at the battery chiller; and
a controller programed to, in response to the heat pump being in dehumidification mode, close the third expansion device to inhibit refrigerant flow to the battery chiller.

2. The vehicle of claim 1 further comprising a coolant subsystem that circulates coolant between a heater core and an intermediary heat exchanger, wherein the intermediary heat exchanger is arranged to transfer heat from a refrigerant circulating within the heat pump to the coolant within the coolant subsystem when the heat pump is in heating mode or in the dehumidification mode.

3. The vehicle of claim 2 wherein coolants within the coolant subsystem and the battery coolant loop do not mix with each other.

4. The vehicle of claim 1 wherein the interior heat exchanger is disposed within a passenger cabin of the vehicle and the exterior heat exchanger is disposed within an engine compartment of the vehicle.

5. The vehicle of claim 1 wherein the exterior heat exchanger is configured to be an evaporator during the dehumidification mode and to be a condenser during cooling mode.

6. The vehicle of claim 1 wherein the heat pump is a vapor compression heat pump subsystem.

7. A vehicle with a climate control system, the vehicle comprising:
a heat pump subsystem including a cabin loop having interior and exterior heat exchangers and a compressor, and a battery loop having a battery chiller and a third actuatable expansion device selectively connecting the cabin loop and the battery chiller in fluid communication, wherein the cabin loop further includes a first actuatable expansion device between the compressor and the exterior heat exchanger, and a second actuatable expansion device between the exterior and interior heat exchangers;
a traction battery;
a battery coolant loop including a radiator and a conduit configured to circulate coolant through the radiator, the battery chiller, and the traction battery, wherein the conduit is arranged such that the battery coolant loop is only connected to the heat pump subsystem via the chiller; and
at least one controller programed to, in response to the heat pump subsystem being in dehumidification mode, command the third expansion device to a closed position to inhibit refrigerant flow to the battery chiller.

8. The vehicle of claim 7 wherein the controller is further programed to, in response to the heat pump subsystem being in the dehumidification mode, command the first and second expansion devices to an open position.

9. The vehicle of claim 8 wherein the open position is a partially open position.

10. A vehicle with a climate control system, the vehicle comprising:
a heat pump subsystem including a cabin loop having interior and exterior heat exchangers and a compressor, and a battery loop having a battery chiller and a third actuatable expansion device selectively connecting the cabin loop and battery chiller in fluid communication, wherein the cabin loop further includes a first actuatable expansion device between the compressor and the exterior heat exchanger, and a second actuatable expansion device between the exterior and interior heat exchangers;
a traction battery;
a battery coolant loop including a radiator and a conduit configured to circulate coolant through the radiator, the battery chiller, and the traction battery, wherein the conduit is arranged such that the battery coolant loop is only connected to the heat pump sunsystem via the battery chiller; and
at least one controller programed to
in response to the heat pump subsystem being in dehumidification mode, command the third expansion device to a closed position to inhibit refrigerant flow to the battery chiller, and
in response to the heat pump subsystem being in the dehumidification mode, command the first and second expansion devices to a throttled position and periodically modulate the throttled position.

11. The vehicle of claim 7 wherein the heat pump subsystem further includes a first fitting connecting the cabin loop and battery loop in fluid communication, and a second fitting connecting the cabin loop and battery loop in fluid communication, and wherein the first fitting is disposed between the exterior heat exchanger and the second expansion device, and the second fitting is disposed between the interior heat exchanger and the compressor.

12. The vehicle of claim 10 wherein the battery loop includes a first line connecting between the first fitting and the battery chiller, and wherein the third expansion device is on the first line.

13. The vehicle of claim 7 further comprising a coolant subsystem that circulates coolant between a heater core and an intermediary heat exchanger, and wherein the intermediary heat exchanger is arranged to transfer heat from a refrigerant circulating within the heat pump to the coolant within the coolant subsystem when the heat pump subsystem is in heating mode or in the dehumidification mode.

14. The vehicle of claim 13 wherein coolants within the coolant subsystem and the battery coolant loop do not mix with each other.

15. The vehicle of claim 7 wherein the interior heat exchanger is disposed within a passenger cabin of the vehicle and the exterior heat exchanger is disposed within an engine compartment of the vehicle.

16. The vehicle of claim 7 wherein the exterior heat exchanger is configured to be an evaporator during the dehumidification mode and to be a condenser during cooling mode.

17. The vehicle of claim 7 wherein the heat pump subsystem is a vapor compression heat pump subsystem.

* * * * *